Jan. 3, 1956  R. P. GOEMANN  2,729,429
AIR CONDITIONING AND DISTRIBUTING SYSTEM AND APPARATUS
Filed Feb. 24, 1954  15 Sheets-Sheet 1

INVENTOR.
Richard P. Goemann
BY J. Stanley Churchill
ATTORNEY

Jan. 3, 1956    R. P. GOEMANN    2,729,429
AIR CONDITIONING AND DISTRIBUTING SYSTEM AND APPARATUS
Filed Feb. 24, 1954    15 Sheets-Sheet 2
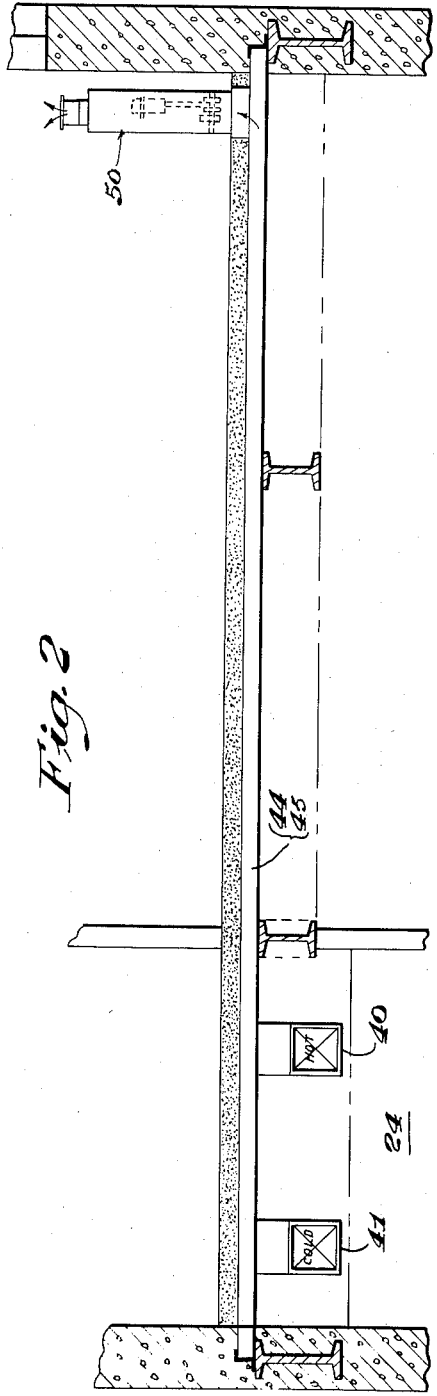
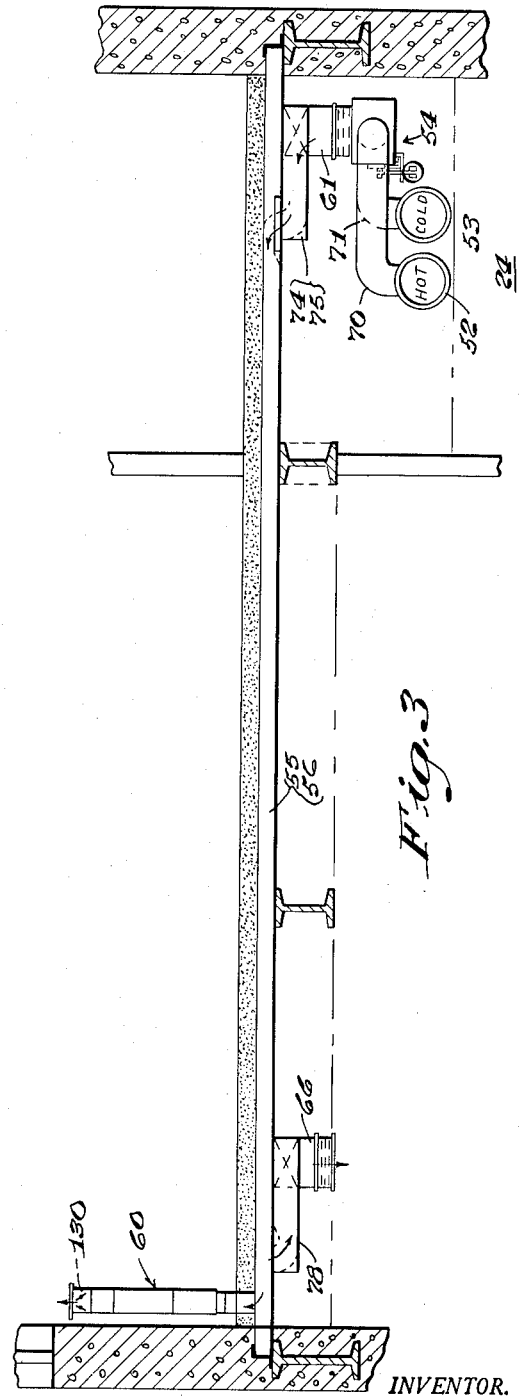
INVENTOR.
Richard P. Goemann
BY
J. Stanley Churchill
ATTORNEY Jan. 3, 1956  R. P. GOEMANN  2,729,429
AIR CONDITIONING AND DISTRIBUTING SYSTEM AND APPARATUS
Filed Feb. 24, 1954  15 Sheets-Sheet 3
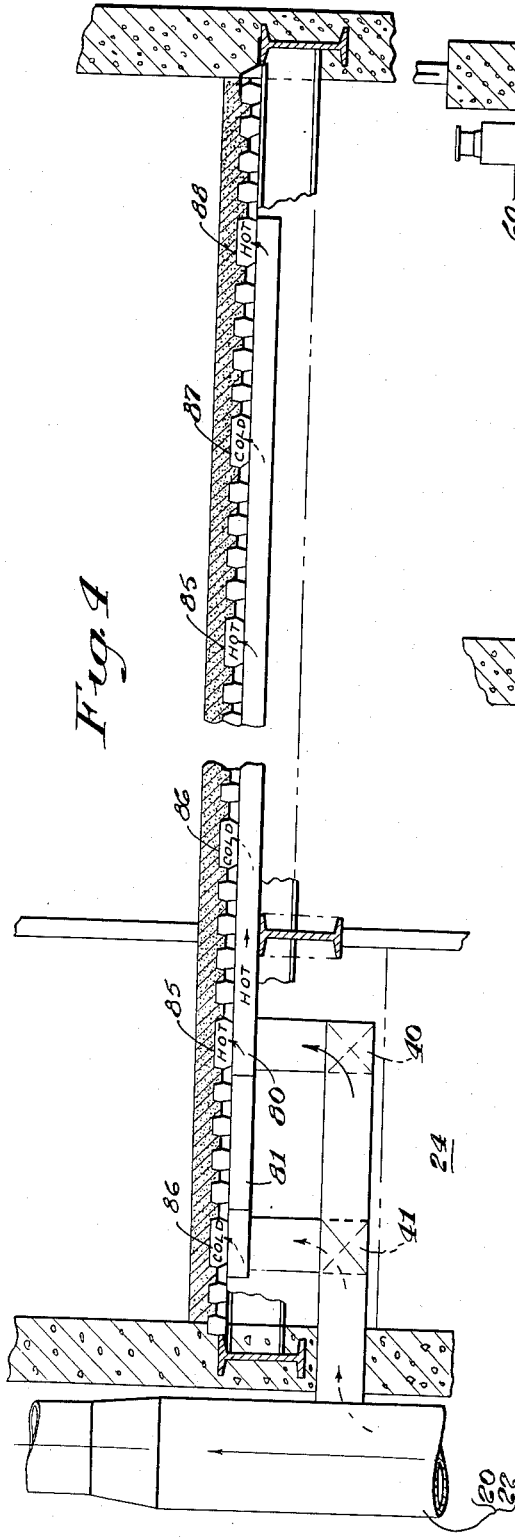
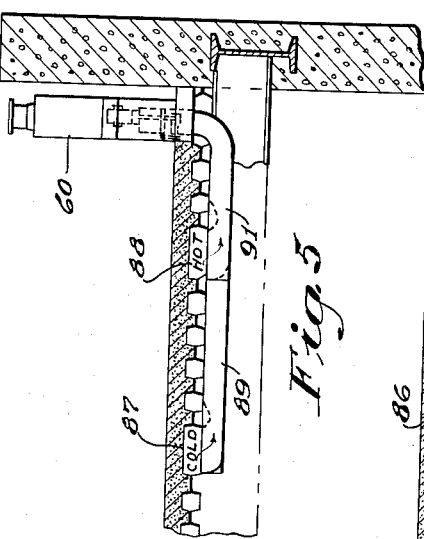
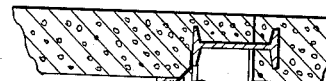
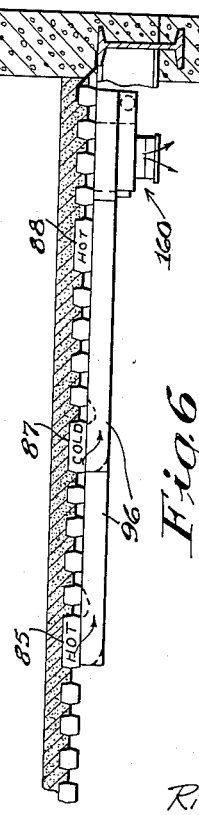
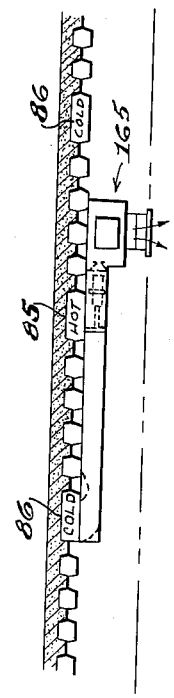
INVENTOR.
Richard P. Goemann
BY
J. Stanley Churchill.
ATTORNEY Jan. 3, 1956 R. P. GOEMANN 2,729,429
AIR CONDITIONING AND DISTRIBUTING SYSTEM AND APPARATUS
Filed Feb. 24, 1954 15 Sheets-Sheet 4

INVENTOR.
Richard P. Goemann
BY
J. Stanley Churchill
ATTORNEY

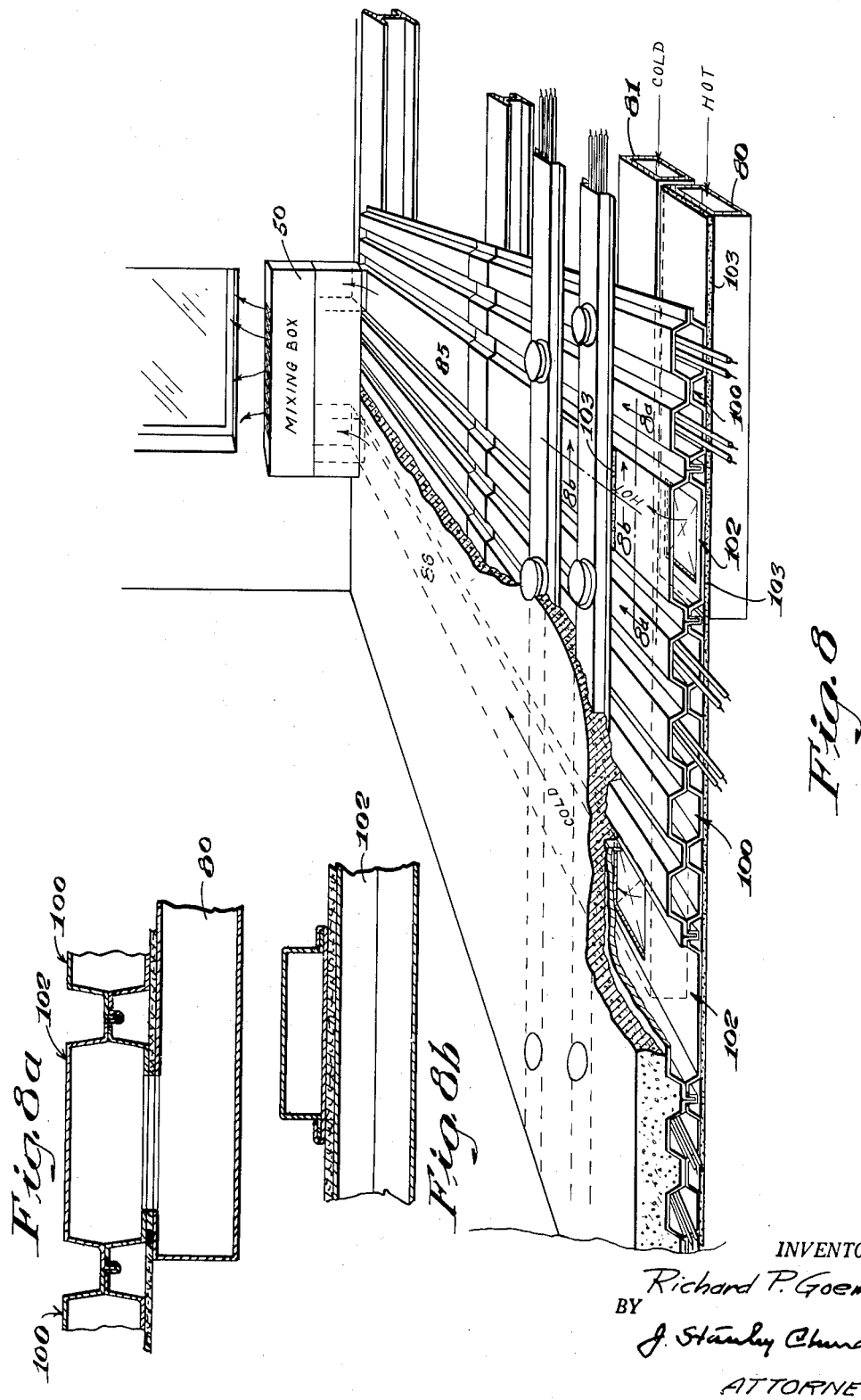

Jan. 3, 1956  R. P. GOEMANN  2,729,429
AIR CONDITIONING AND DISTRIBUTING SYSTEM AND APPARATUS
Filed Feb. 24, 1954  15 Sheets-Sheet 6
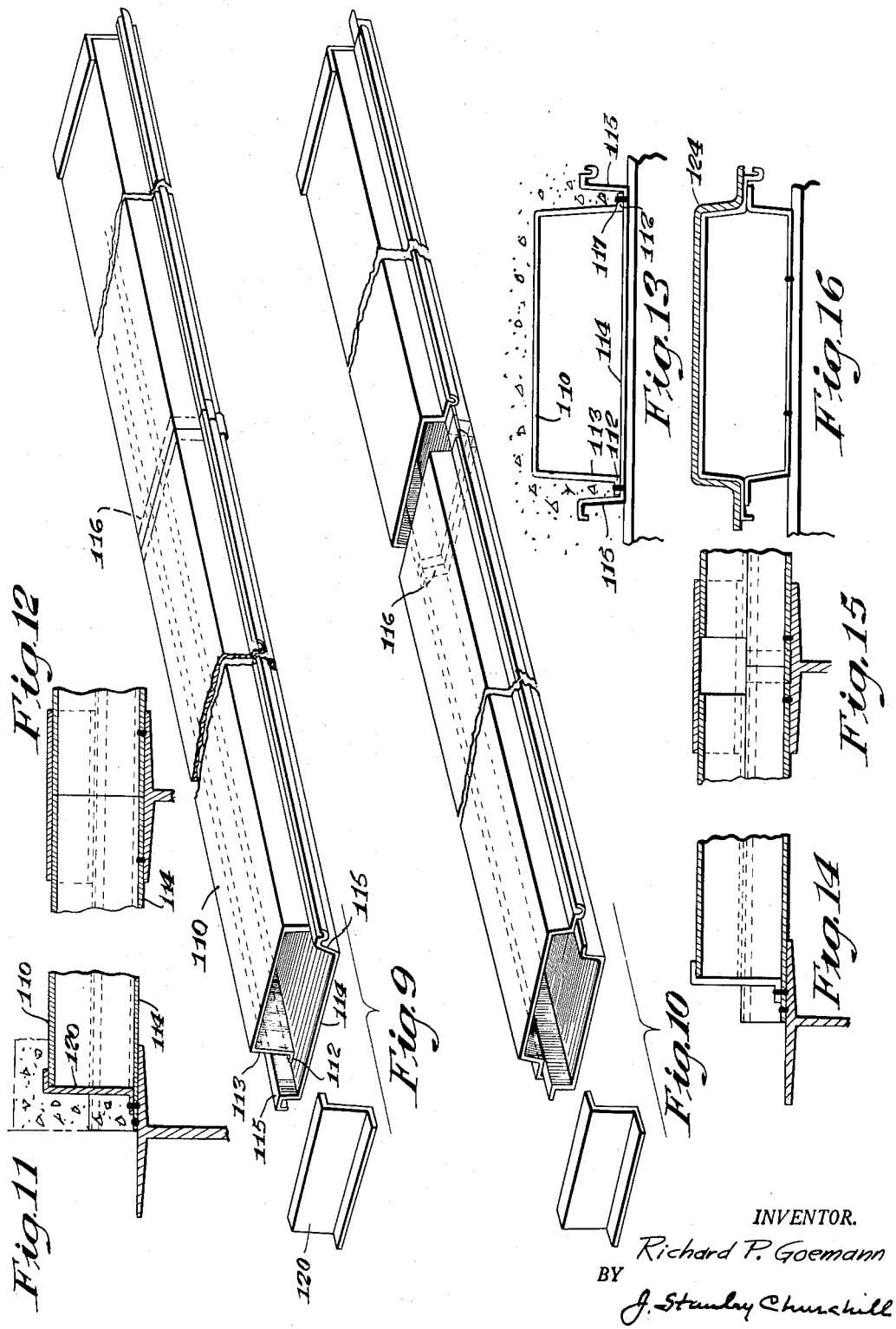
INVENTOR.
Richard P. Goemann
BY
J. Stanley Churchill
ATTORNEY Jan. 3, 1956    R. P. GOEMANN    2,729,429
AIR CONDITIONING AND DISTRIBUTING SYSTEM AND APPARATUS
Filed Feb. 24, 1954    15 Sheets-Sheet 7
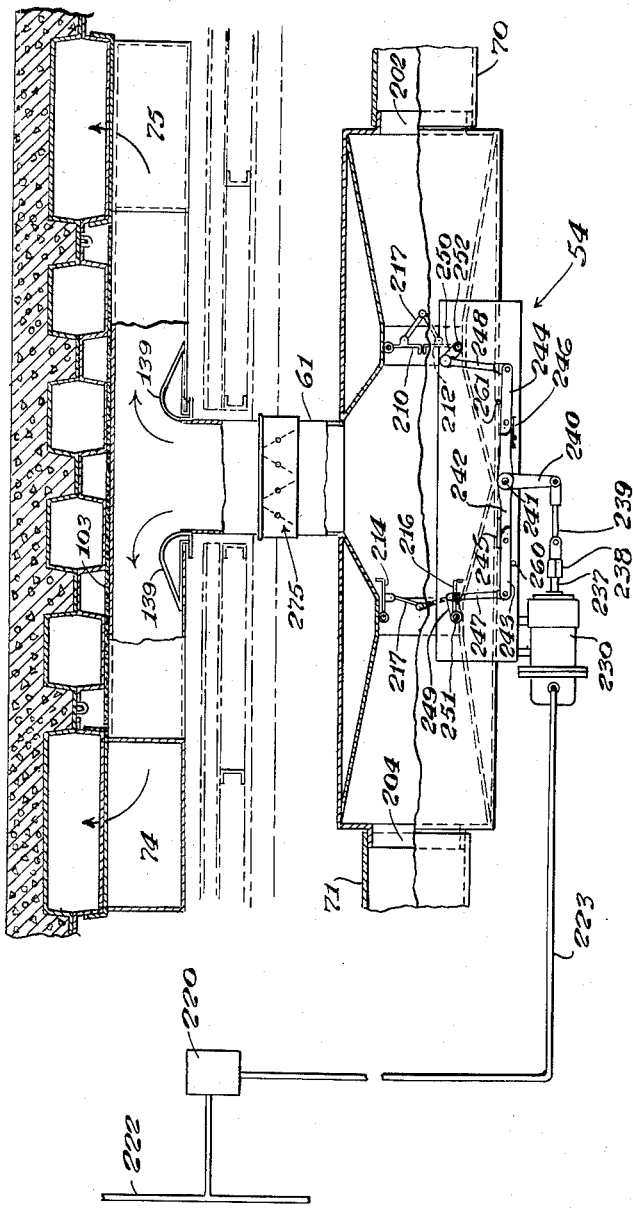
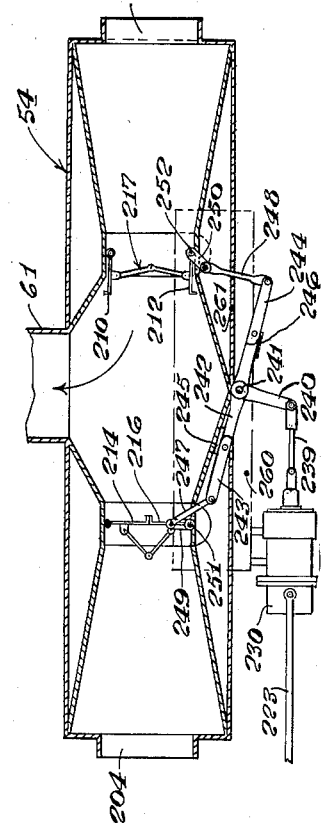
INVENTOR.
Richard P. Goemann
BY
J. Stanley Churchill
ATTORNEY Jan. 3, 1956 R. P. GOEMANN 2,729,429
AIR CONDITIONING AND DISTRIBUTING SYSTEM AND APPARATUS
Filed Feb. 24, 1954 15 Sheets-Sheet 10
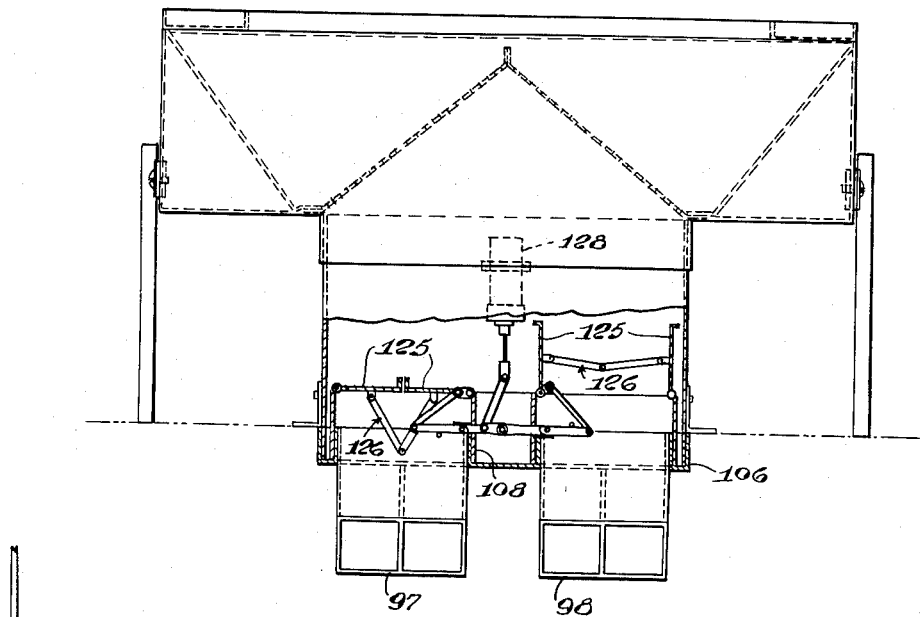
Fig. 25
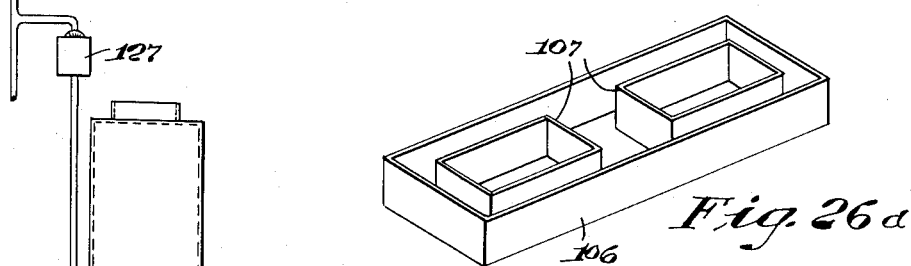
Fig. 26a
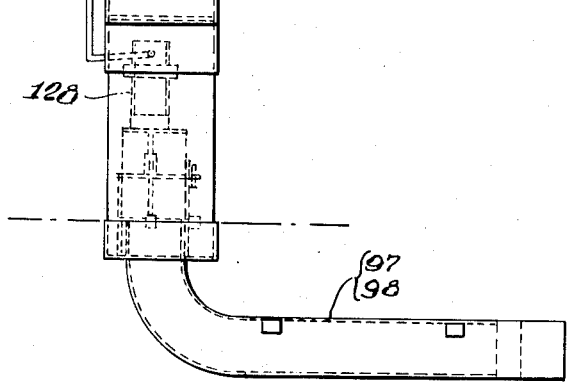
Fig. 26b
Fig. 26
INVENTOR.
Richard P. Goemann
BY
J. Stanley Churchill.
ATTORNEY Jan. 3, 1956  R. P. GOEMANN  2,729,429
AIR CONDITIONING AND DISTRIBUTING SYSTEM AND APPARATUS
Filed Feb. 24, 1954  15 Sheets-Sheet 11

INVENTOR.
Richard P. Goemann
BY
J. Stanley Churchill.
ATTORNEY

Jan. 3, 1956 R. P. GOEMANN 2,729,429
AIR CONDITIONING AND DISTRIBUTING SYSTEM AND APPARATUS
Filed Feb. 24, 1954 15 Sheets-Sheet 12
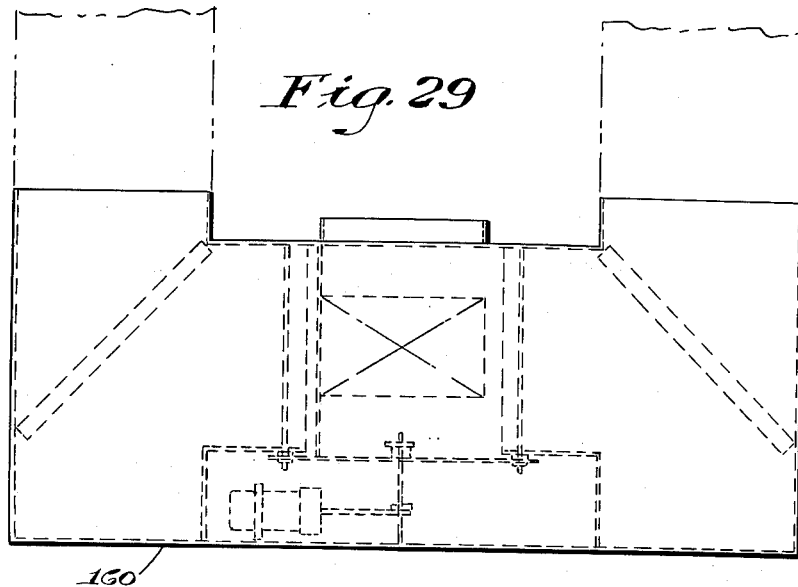
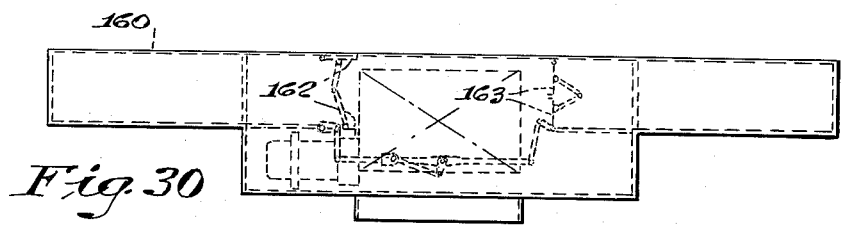
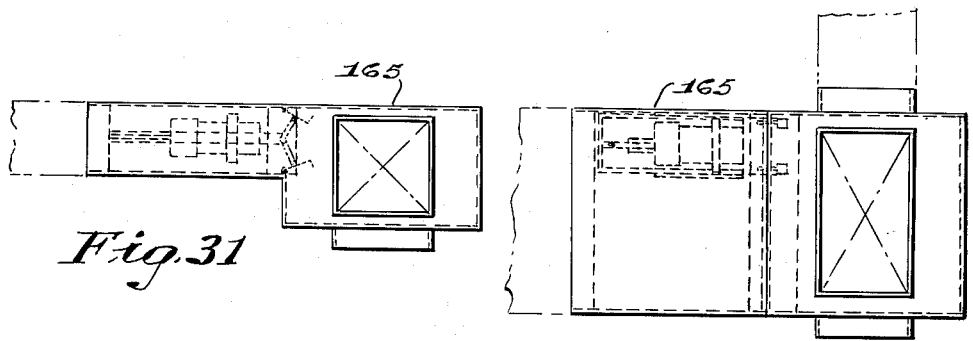
INVENTOR.
Richard P. Goemann
BY
J. Stanley Churchill
ATTORNEY

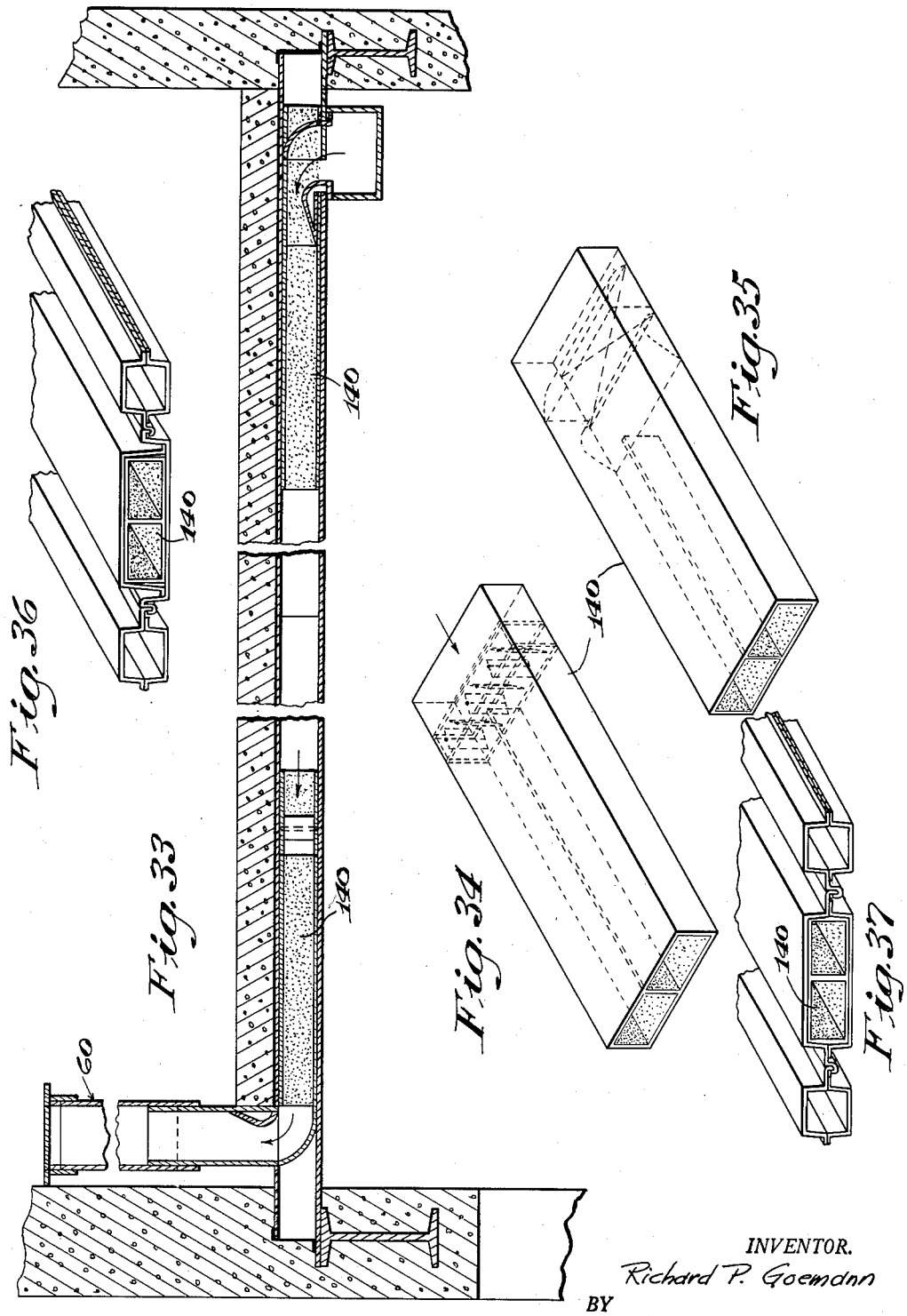

INVENTOR.
Richard P. Goemann
BY
J. Stanley Churchill
ATTORNEY

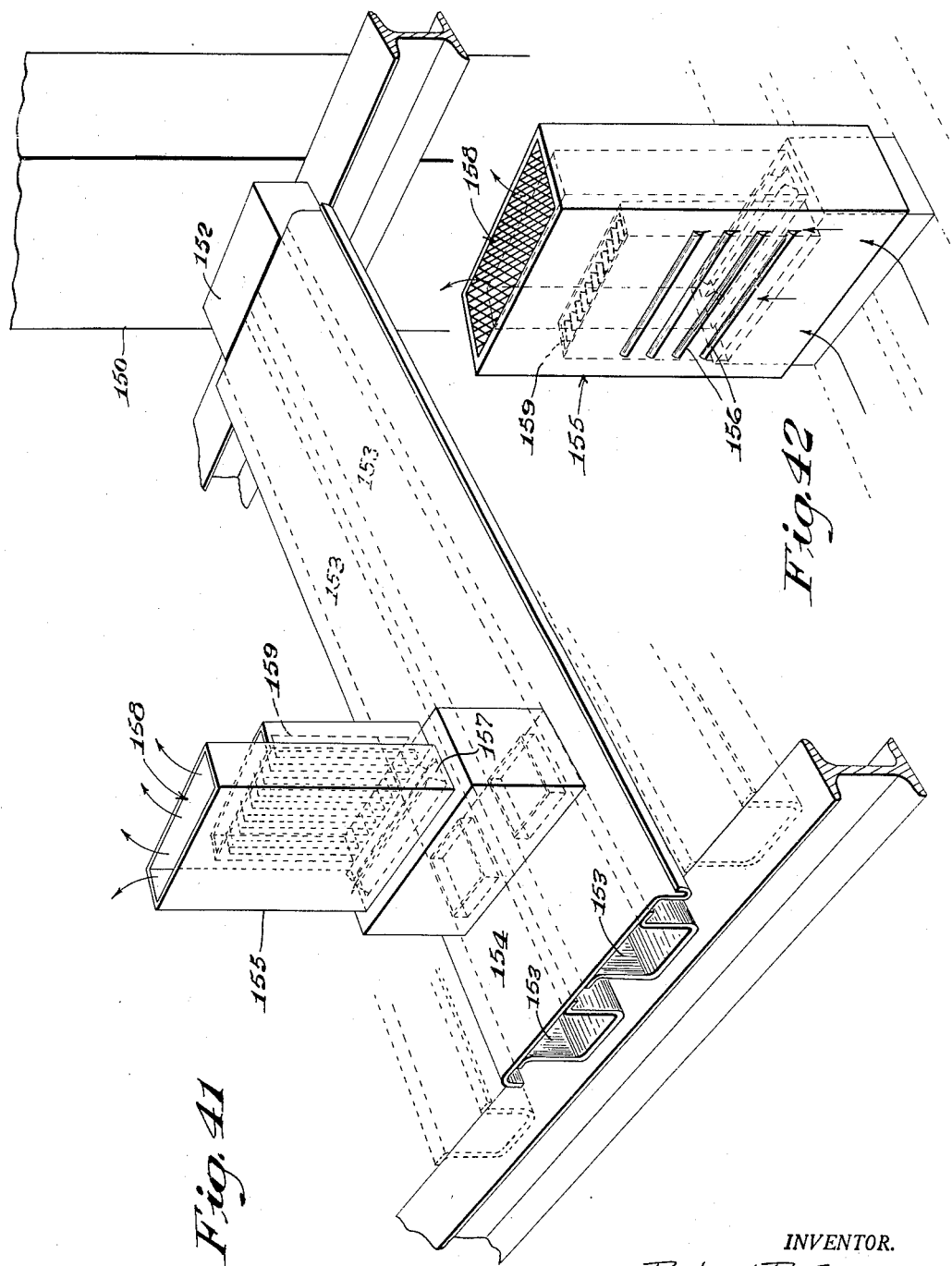

United States Patent Office 2,729,429
Patented Jan. 3, 1956

2,729,429

AIR CONDITIONING AND DISTRIBUTING SYSTEM AND APPARATUS

Richard P. Goemann, Port Washington, N. Y., assignor to H. H. Robertson Company, Pittsburgh, Pa., a corporation of Pennsylvania Application February 24, 1954, Serial No. 412,217

25 Claims. (Cl. 257—8)

This invention relates to a multi-story commercial building having a novel air conditioning and distributing system.

One object of the invention is to provide a novel construction of multi-story building wherein provision is made for distributing air from supply ducts in the service core through cellular floors constituting the load supporting floor structure of the building in such a manner as to minimize the space requirements for ducts and other accessories in the spaces between floors and the ceilings immediately below the same.

A further object of the invention is to provide a novel building structure of the character described wherein at least some of the load supporting floors of the building comprise the cellular metal floors illustrated in the United States patent to Young, No. 1,867,433, and wherein provision is made for distributing air from air supply ducts in the service core throughout the building utilizing the cells of the structural floor to effect distribution of the air in a novel manner, and one wherein the space requirements between the ceiling of one story of a building and the floor of the next higher story are reduced to a minimum, and wherein the required air distribution may be effected irrespective of the direction of extension of the floor cells with respect to the service core in the building.

A still further object of the invention is to provide an air conditioning and distributing system which enables the air to be distributed throughout and at different points over any desired portion of the building and which enables different areas in the building to be air conditioned to different degrees.

A still further object of the invention is to provide novel efficient and practical apparatus for air conditioning a story of a building which may be operated in summer and winter without substantial alteration of the apparatus.

Other objects of the invention are to provide novel structural features of the present air distributing and conditioning apparatus and components thereof which per se have important utility in addition to their usefulness in connection with the present multi-story building embodying the novel air distributing and air conditioning system.

In the drawings illustrating the preferred embodiment of the invention:

Fig. 2 is a cross-sectional view taken on the line 2—2 of Fig. 1 illustrating a portion of the floor section at one story of the building wherein warm air and cool air are supplied to a dispersing unit having provision for mixing the air in the dispersing unit;

Fig. 3 is a cross-sectional view taken on the line 3—3 of Fig. 1 illustrating a portion of the building wherein warm air and cool air are mixed prior to entering the flooring cells;

Fig. 4 is a cross-sectional view taken on the line 4—4 of Fig. 1 illustrating a portion of the building wherein the flooring cells run parallel to the exterior wall of the building and showing an equalizing duct forming a part of a grid system to be described;

Fig. 5 is a cross-sectional detail view taken on the line 5—5 of Fig. 1 illustrating a sill mixing and dispersing unit connected to the flooring cells;

Fig. 6 is a cross-sectional view taken on the line 6—6 of Fig. 1 illustrating a ceiling mixing and dispersing unit connected to the flooring cells;

Fig. 7 is a cross-sectional view taken on the line 7—7 of Fig. 1 illustrating an interior zone control unit for dispersing cool air;

Fig. 8 is a perspective view of a portion of the air conditioning system showing the cellular flooring embodying both air conducting cells and cells for distributing wiring for electrical service;

Fig. 8a is a cross-sectional detail taken on the line 8a—8a of Fig. 8;

Fig. 8b is a cross-sectional detail taken on the line 8b—8b of Fig. 8;

Fig. 9 is a perspective view of one form of air conducting flooring cell and showing one of the end closure plates separated therefrom;

Fig. 10 is a similar view of a modified form of air conducting flooring cell;

Fig. 11 is a cross-sectional detail view of one end of the cell shown in Fig. 9 connected to a girder and showing the end closure plate;

Fig. 12 is a cross-sectional detail view of the cell shown in Fig. 9 wherein the ends of two cells are joined in abutting relation and connected to a cross beam;

Fig. 13 is an end view in cross section at the joint between the ducts shown in Fig. 9;

Figure 19:
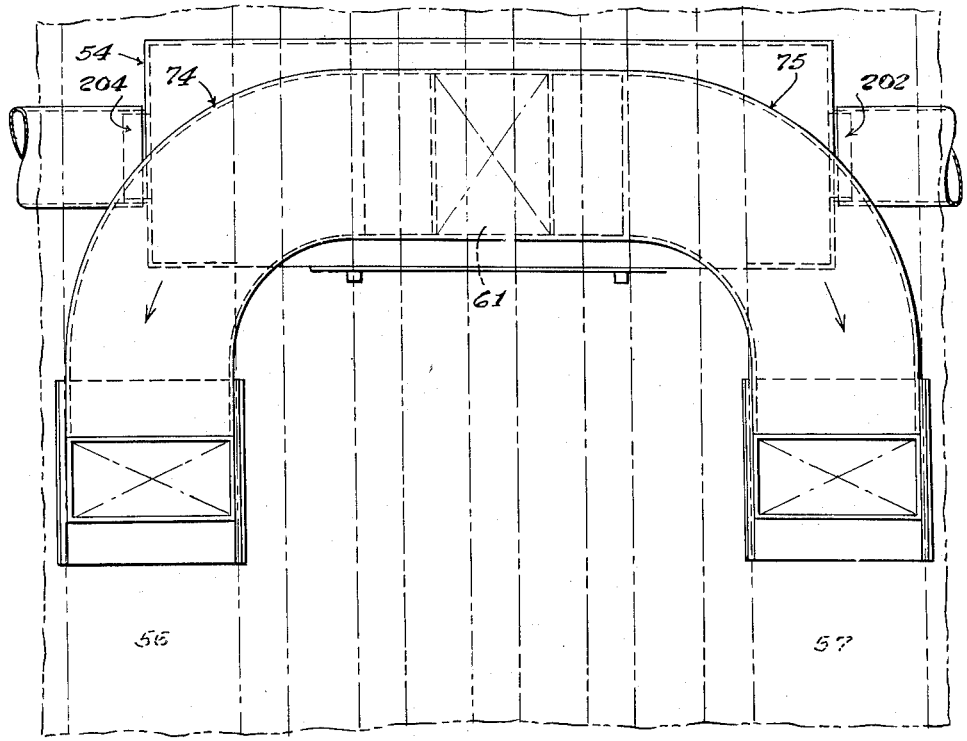
Figure 20:
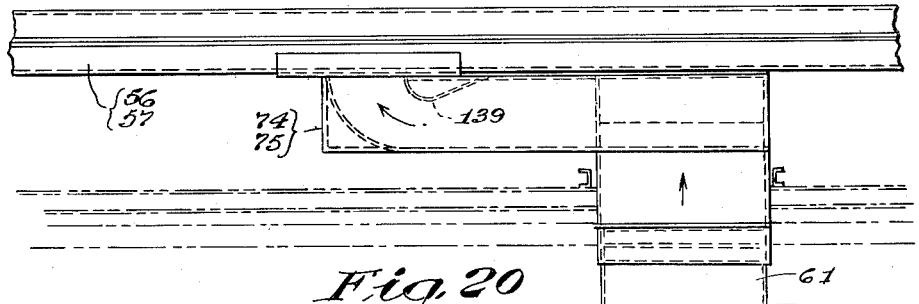
Figure 20A:
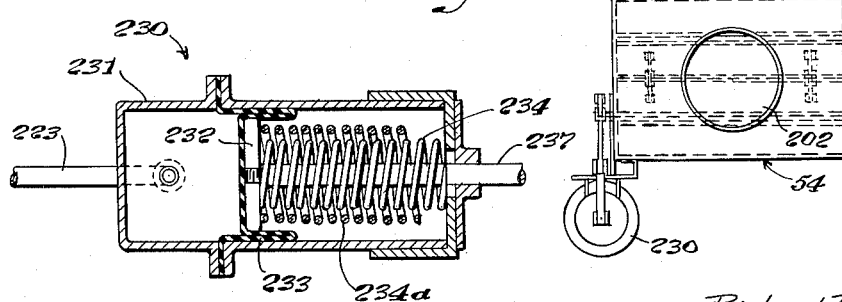
Figure 21:
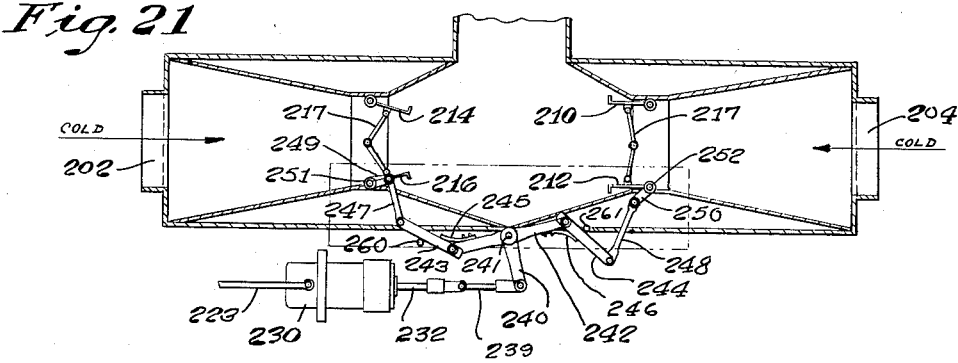
Figure 22:
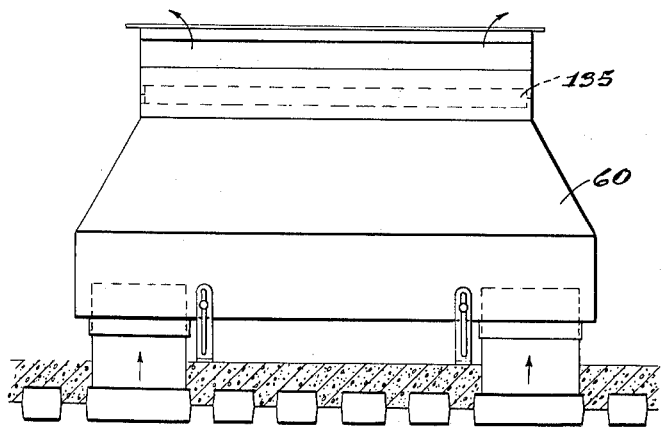
Figure 23:
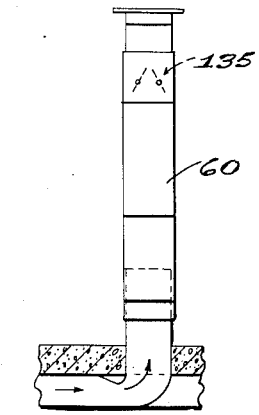
Figure 24:
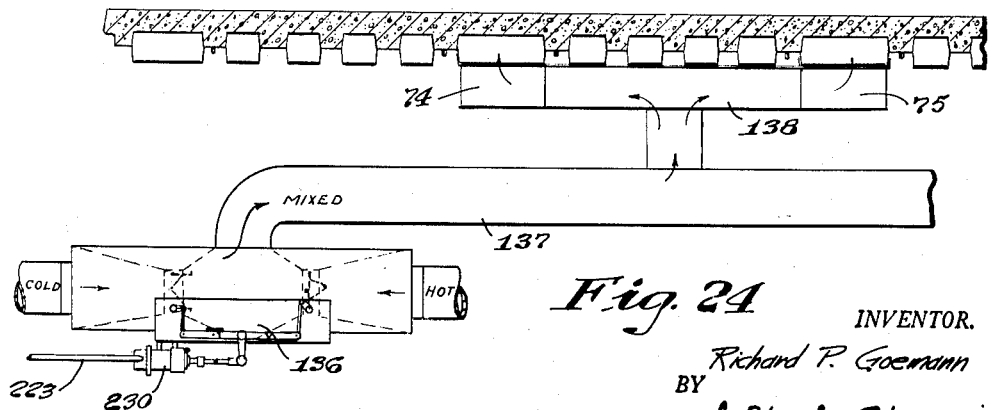
Figure 27:
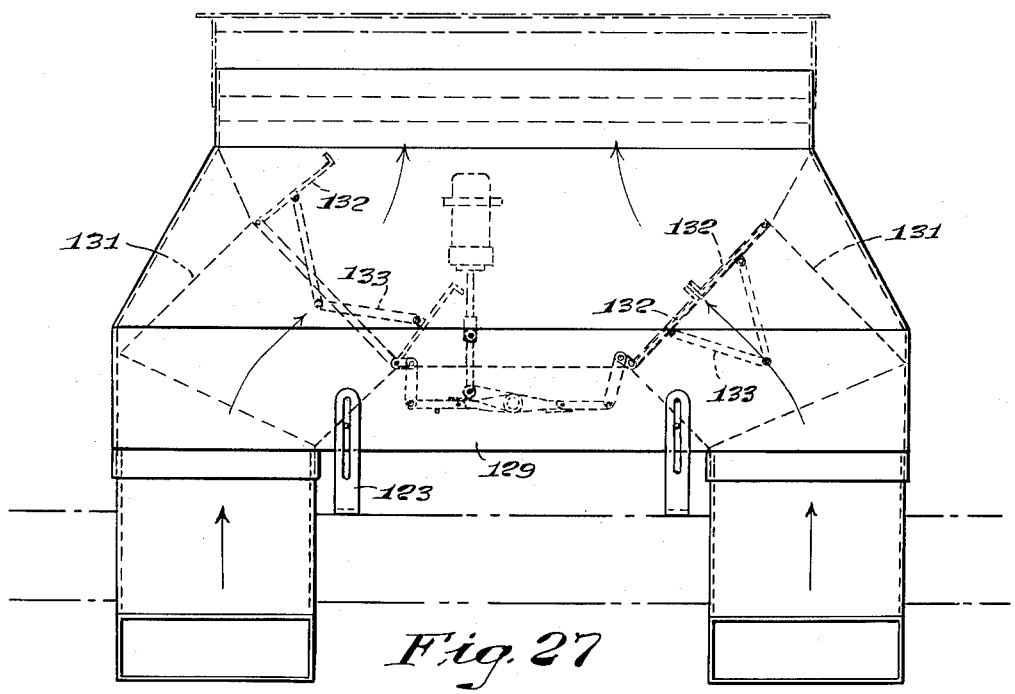
Figure 28:
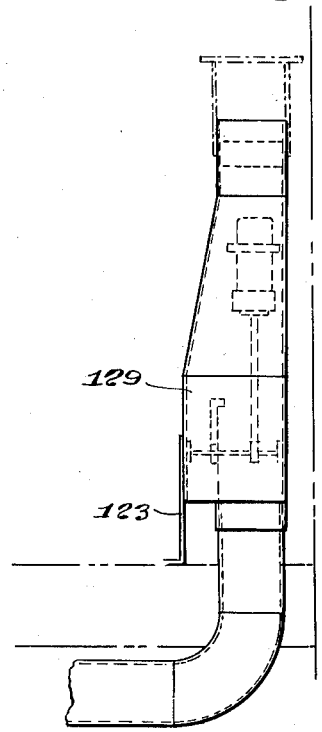
Figure 39:
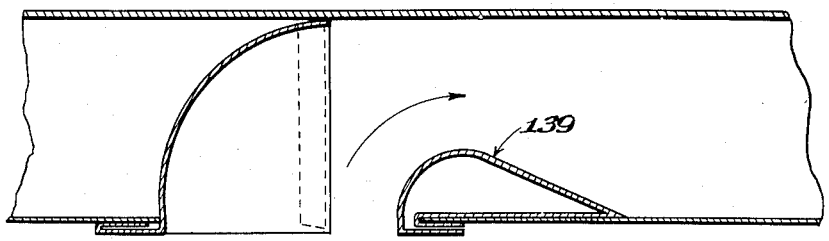
Figure 38:
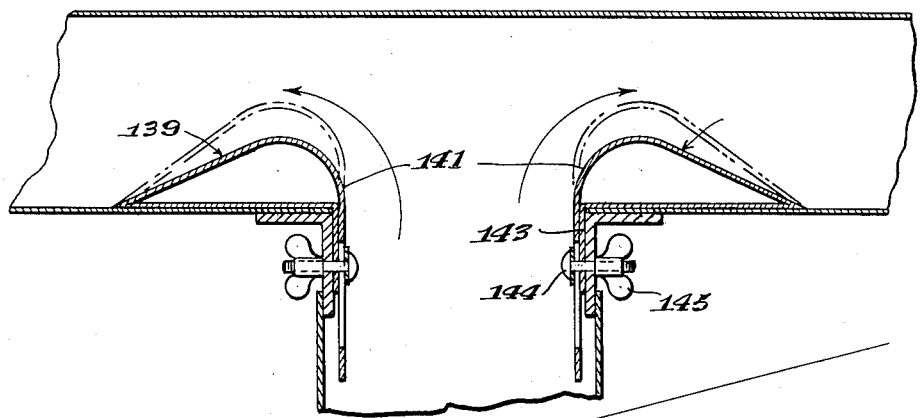
Figure 40:
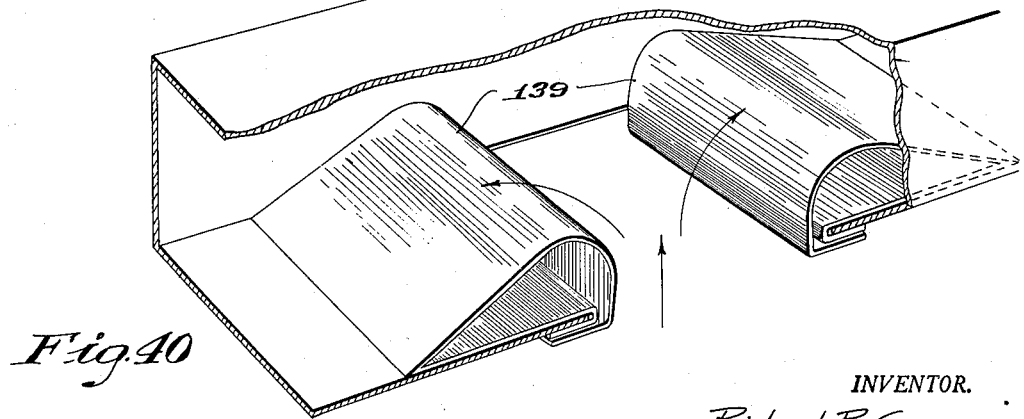

Figs. 14, 15 and 16 are cross-sectional detail views of the modified form of air conducting cell shown in Fig. 10, Figs. 14, 15 and 16 corresponding to Figs. 11, 12 and 13 of the cell shown in Fig. 9;

Fig. 17 is a cross-sectional detail view of an air mixing unit connected to the flooring cells and automatic control mechanism for varying the mixture of warm and cool air;

Fig. 18 is a cross-sectional view of the control mechanism in a different position of operation;

Fig. 19 is a plan view of a dual connecting duct between the mixing unit and two air conducting cells;

Fig. 20 is a side elevation of the mixing unit shown in Fig. 17;

Fig. 20a is a cross-sectional view through the air motor shown in Fig. 17;

Fig. 21 is a cross-sectional view of the automatic control mechanism in another position of operation;

Figs. 22 and 23 are front and side elevations respectively of a sill dispersing unit for dispersing the mixed air;

Fig. 24 is a view illustrating the air mixing unit connected to air ducts remote from the mixing unit;

Figs. 25 and 26 are front and side elevation views respectively of a sill dispersing and mixing unit having automatic control mechanism for varying the mixture of warm and cool air delivered thereto by ducts connected to the air cells;

Figs. 26a and 26b are details in perspective to be referred to;

Figs. 27 and 28 are front and side elevation views respectively of another form of sill dispersing and mixing unit having automatic control mechanism for mixing the warm and cool air delivered thereto;

Figs. 29 and 30 are plan and front elevation views respectively of a ceiling dispersing and mixing unit having automatic control mechanism for varying the mixture of warm and cool air;

Figs. 31 and 32 are side elevation and plan views respectively of an automatically controlled interior zone dispersing unit;

Fig. 33 is a cross-sectional view of an air conducting cell provided with sound absorbing and volume control means;

Fig. 34 is a perspective view of a sound absorbing insert provided with a volume control damper, as shown at the left in Fig. 33;

Fig. 35 is a perspective view of the sound absorbing insert shown at the right in Fig. 33;

Fig. 36 is a perspective view of an air conducting cell provided with a sound absorbing insert;

Fig. 37 is a perspective view of the modified form of air conducting cell provided with a sound absorbing insert;

Fig. 38 is a cross-sectional detail view of air foils embodied in the air conducting cell for air flow in both directions;

Fig. 39 is a similar view of air foils for directing the air in one direction only;

Fig. 40 is a perspective view of the air foils shown in Fig. 38;

Fig. 41 is a perspective view of a modified form of air duct connected to a sill dispersing unit having provision for induced room air for tempering the air delivered to the dispersing unit; and Fig. 42 is a perspective view showing the front of the dispersing unit shown in Fig. 41.

The apparatus and system which has been illustrated as embodied in an air conditioning and an air distributing system, particularly in a multi-story building, may under varying conditions of operation serve the several purposes of ventilation, exhausting air from within the building, for heating a part of the building, for cooling a part or all of the building and for general air conditioning purposes. For convenience of description the apparatus and system will be at times referred to herein as an "air conditioning and distributing system."

The present invention may be embodied in a multi-story building in which provision is made for distributing air through a cellular load supporting floor structure in a novel manner such that economies in space between a particular floor at one story and the ceiling of the next story below may be effected, and as a result the framework of the building may be limited to the minimum height required to produce a predetermined number of stories of the building, each of a predetermined height from floor to ceiling.

The present air conditioning systems for multi-story buildings now on the market embody ducts at each floor where it is desired to effect the air conditioning. These ducts are of relatively large cross-sectional dimension and occupy a substantial space when interposed between the floor and ceiling and are designed to conduct so-called "primary air" from a source of supply, usually located in the basement of the building through risers in the usual service core of the building and then through such relatively large distributing ducts between the ceiling and floor to specially designed outlet boxes usually disposed around the periphery of the building and below the windows of the building. These outlet boxes are usually provided with heating or cooling coils, and in the operation of such systems the air within the building or within the particular room or portion of the building in which the sill boxes are located is caused to circulate through the sill boxes by induction caused by the flow of primary air through a special orifice or device in the sill box. In other words the prior art systems all embody at each story, air ducts running beneath the floor and between it and the ceiling of the story below, and the successful operation of the system depends upon the conditioning of the air in the sill boxes and the induction of the proper amount of air from within the room or portion of the building in which the sill box is located. Such an air distribution system in addition to the elaborate duct system and the height which is wasted by the ducts between the ceiling and the floor, as described, not only is less efficient in operation but also requires the distribution of water to the individual sill boxes from a source in the service core requiring a more or less tailor-made installation depending upon the location of the individual sill boxes and their distance from the service core. Such systems leave much to be desired in the way of flexibility and cost.

In general the present system seeks to eliminate the waste space above referred to between the ceiling and the floor in a multi-story building which is, as stated, required by the ducts of prior art air conditioning systems. This is accomplished by utilizing a cellular floor, such as that illustrated in the United States patent to Young, above referred to, as a component of the present air conditioning and distribution system by which both hot and cold air or by which cool air in different volumes or in different degrees of conditioning, or for heating or cooling purposes may be distributed in an economical, highly flexible and superior manner to outlets disposed not only around the periphery of the building but also at selected intermediate locations, and which may discharge either into the building upwardly through suitable outlet boxes or downwardly through ceiling outlets into the story next below.

Figure 1:
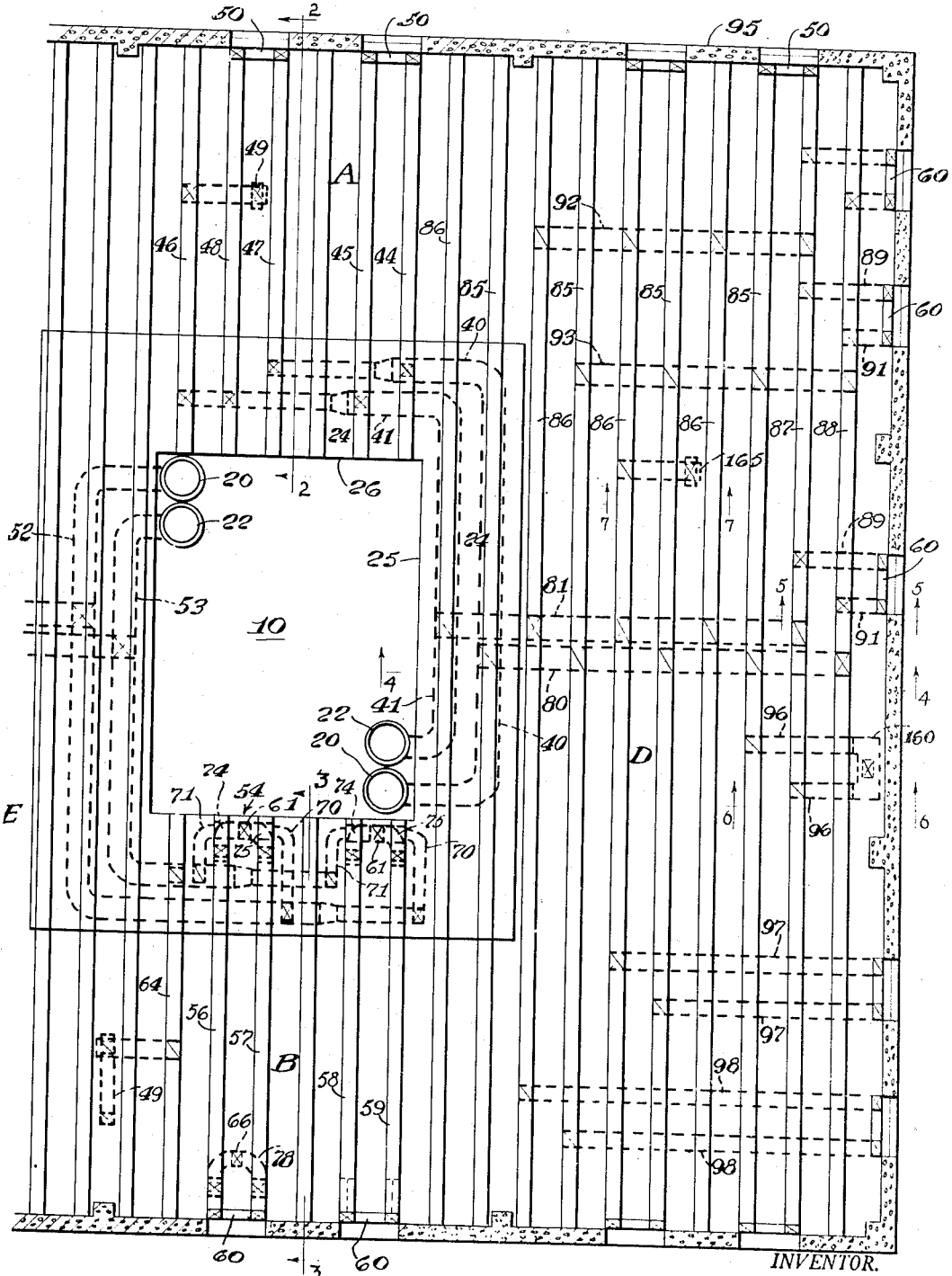
Fig. 1 is a more or less diagrammatic plan view of one story of a multi-story building embodying the present air conditioning system.

Referring to the drawings and particularly to Fig. 1, which as above stated illustrates in plan view a sufficient portion of one of the floors of a multi-story building embodying the present air conditioning and distributing system to enable the invention to be understood, as therein shown, 10 represents the usual service core or shaft which may extend from the basement of the building upwardly to the upper story thereof and through which the elevators, plumbing and other piping, including piping for water, gas and other services are arranged to extend upwardly from the basement, and at the several stories of the building the different services, etc., are distributed to the desired locations in the building. In accordance with the present invention the load supporting floors of those portions of the building where it is desired to distribute air in accordance with the present invention are made of a cellular structure, and the floor may comprise any usual or preferred form of cellular floor. In the preferred embodiment of the invention and as illustrated in Fig. 1, the load supporting floor may comprise a cellular metal floor of the type illustrated in the Young patent above referred to. As herein shown, the flooring is arranged to provide a series of cells extending in one portion of the building in a direction parallel to the two sides of the service core, while in other portions of the building the cells are arranged to extend at right angles to the opposed ends of the service core.

For purposes of illustration the air conditioning and distributing system is herein shown as comprising a system in which provision is made for conducting a supply of heated air upwardly through one set of risers or vertical supply ducts 20 located at opposed corners of the service core, and cold air is conducted upwardly through a second set of risers or vertical supply ducts 22 similarly located. Customarily in multi-story buildings a corridor indicated at 24 is arranged to extend along at least one side 25 and one end 26 of the service core or vertical shaft 10, and in most instances such a corridor extends completely around the service core. Hot and cold air is supplied to selected of a plurality of the cells in the portions of the floor opposite the ends of the service core, and which portions are designated A and B in Fig. 1, through duct connections, as will be described, from the respective sets of the hot and cold air risers 20, 22 in the service core. In order that the major portion of the portions A and B of the building may be of maximum height between ceiling and floor I prefer to run the connecting ducts or headers 40, 41 from one set of hot and cold risers 20, 22 through the sections of the corridor along one side and one end of the service core. As shown in Fig. 2, the hot and cold air connecting ducts 40, 41 are hung at near the ceiling of the corridor and are connected as indicated in Figs. 1 and 2 to selected floor ducts 44, 45 and also to as many other similar ducts as 47, 48 depending upon the window spacing at the part of the periphery of the building to which the floor cells run from the end of the corridor. As indicated in Fig. 1, the part of the ducts 40, 41 beyond the connector to the floor cells 44, 45 may be reduced in sectional dimensions, and as indicated, the cold air duct 41 may be connected to a separate floor cell 46 from which cold air may be discharged through an outlet 49 at a point midway between the corridor and outer wall of the building as shown. From inspection of Figs. 1 and 2 it will be seen that the hot and cold air may be conducted through any number of the selected floor cells to distribute the air to near the outer building wall, preferably at the windows. The separate supplies of hot and cold air may be separately discharged from the floor cells and mixed in the outlet boxes 50 erected at and immediately below the window openings at the outer wall of the building so that air of the desired temperature may be discharged into the room at the various outlet locations. Thus, the structure illustrated in Fig. 2 contemplates the mixture of the hot and cold air in the distributing box within the building, as will be hereinafter described in detail.

Also as illustrated in Fig. 1, provision is made for distributing air to the portions B of the building, and for purposes of illustration a system is shown wherein the hot and cold air is mixed to a predetermined temperature before being introduced into the floor cells. As shown in Figs. 1 and 3, air streams from the second set of the hot and cold air risers 20, 22 located in the opposite corner of the service core are led through distributing ducts 52, 53 into specially designed mixing chambers 54 erected in the part of the corridor along the second end of the service core as illustrated in Figs. 1 and 3 so that from the mixing chambers 54 air of the required temperature may be introduced through connecting ducts 61 into selected and spaced floor cells 56, 57 and 58, 59 running from the corridor in a direction at right angles to the end of the service core and terminating under windows at the periphery of the building where the air is discharged from outlets 60 into the room. As shown in Fig. 1, the cold air may be connected to a separate floor cell 64 from which cold air may be discharged at one or more points intermediate the corridor and the outer wall of the building. In some instances selected cells 56, 57, 58, 59 may be connected to ceiling outlets 66 from which the air may be discharged into the building at the story below the floor. These ceiling outlets may take special forms, as will be hereinafter described.

From the above description and by reference to Figs. 1 and 3 it will be observed that the hot and cold air streams from the risers are conducted through the ducts 52, 53 located in the corridor where the loss of ceiling height is unimportant and transmitted through the sets of curved ducts 70, 71 to the mixing chambers 54 and thence upwardly and through branch ducts 74, 75 to two cells of the floor leading directly to the windows, and at the windows the mixed air of the required temperature may pass directly into the outlets 60 located at the window, or a portion thereof may be distributed to the story below through ceiling outlets 66 connected by branch ducts 78 to the respective cells, as shown in Fig. 3.

In order to distribute the hot and cold air from two sets of the connecting ducts 40, 41 located in the corridor to the portions of the building indicated generally at D and E wherein the floor cells extend parallel the sides of the service core 10, it is preferred to employ a pair of air supply header ducts 80, 81 as shown in Figs. 1 and 4 connected to selected floor cells in each of the portions of the floor D and E. For illustrative purposes the system of air distribution has been shown and will be described only for the section D of the floor. These header ducts 40, 41 may, as shown in Fig. 4, be connected with the hot and cold air risers 20, 22 as indicated in Figs. 1 and 4, and the hot air is led into selected, and as herein shown, alternate floor cells 85 and the cold led into intermediate and alternate floor cells 86. The header ducts 80, 81 are preferably extended to the two outer floor cells 87, 88 nearest the wall of the building so that the hot and cold air may be distributed lengthwise of the outer wall, and connection is preferably made at each window location by conduits 89, 91 from these distributing cells 87, 88 to outlet boxes indicated at 60 located at some of the windows.

From an inspection of Fig. 1, it will be observed that in the half portion of the section D of the floor I have illustrated one arrangement of air distributing ducts, and in the second section of the portion D of the floor I have illustrated a different arrangement of distributing ducts for distributing the air to the sill boxes. It will be understood that this showing is for illustrative purposes only, and in some instances I may prefer to utilize either system in the entire portion D of the floor and also in the entire portion E of the floor.

Referring now to Figure 1, as stated for illustrative purposes in the half of the portion D of the floor which lies adjacent the portion A of the floor, I have shown two equalizing ducts 92, 93. One duct 92 is connected across and to each of a plurality of cold air cells 86 of the floor, and the other equalizing duct 93 is connected across and to each of the hot air cells 85 of the floor. The equalizing ducts are located between the incoming central header ducts 80, 81 and the end wall 95 of the building, and the number of sets of equalizing ducts employed will of course depend on the length of the building.

Figure 4A:
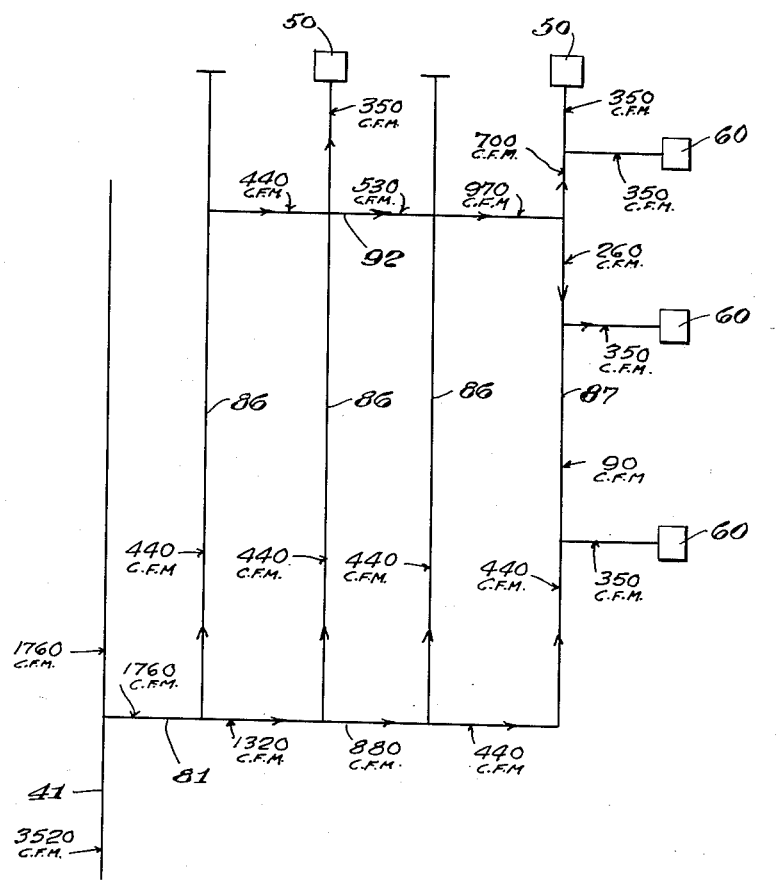
Fig. 4a is a diagrammatic "flow sheet" indicating the function of the equalizing ducts.

Referring now to Fig. 4a which illustrates a theoretical flow sheet in connection with the distribution of cold air from the header duct 81 of Fig. 1, and based on the assumption that a high pressure air system is employed wherein cold air from the riser 22 is flowing through the connecting duct 41 at a capacity of around 3500 C. F. M. at the point where the stream divides at the connection between the header 81 and the duct 41, so that as the cold air stream flows through the header 81 it has a capacity of around 1740 C. F. M. For convenience of description, assume that at this point this figure is 1760 C. F. M. As the cold air stream flows through the header 81 it is presented with four paths leading through the four cold air cells 86 of the floor to which the header 81 is connected, as indicated. Accordingly the flow through each of the four cells 86 from the header 81 has a capacity of 440 C. F. M. Following the flow through the header as each 440 C. F. M. is taken off the stream, the capacity drops to the successive figures of 1320 C. F. M., 880 C. F. M., and 440 C. F. M., as indicated on the flow sheet. Considering now the flow through the first cold air floor cell 86, beginning at the junction of the equalizing duct 92 therewith, air of a capacity of 440 C. F. M. flows from the floor cell through the first portion of the equalizing duct 92 until it reaches the second floor cell 86 which is connected with the sill box 50 at the end of the building. In practice the sill boxes around the building at each window require about 350 C. F. M. and of the 440 which is flowing through the first portion of the equalizing duct 350 is conducted through the second floor cell to the sill box 50, leaving 90 C. F. M. which combines with the 440 C. F. M. flowing through the second floor cell from the header 81, making a total of 530 C. F. M. which will flow through the second increment of the equalizing duct 90 and will pick up the 440 C. F. M. flowing from the header duct through the third floor cell 86, so that in the last increment of the equalizing duct 90 at the point where it joins the cold air floor cell 87 there will be a capacity of air of 970 C. F. M. This air is utilized to service the two sill boxes 50 and 60 as indicated in the flow sheet, taking 700 of the 970 feet and leaving about 260 feet to flow through the floor cell 87 in the direction of the arrow toward the intermediate sill box 60. Considering now the flow from the header duct 81 through the floor cell 87, the first sill box encountered takes 350 C. F. M. leaving about 90 C. F. M. which covered with the 260 C. F. M. flowing in the reverse direction serves the intermediate sill box 60, as clearly shown in the flow sheet.

The flow through the hot air header duct 80 and thence through the four hot air floor cells connected therewith and the flow through the equalizing duct 93 follows the same pattern of flow sheet, and the foregoing description in connection with the cold air flow is believed to be sufficient for a clear understanding of the invention, and the utility of the equalizing ducts in providing a system of air flow, utilizing all of the floor ducts to provide the necessary radiant heating and to enable the sill boxes to be serviced with a required amount of air and with minimum variations in capacity at the different sill boxes, will be apparent.

An alternative system of air distribution from the header ducts 80, 81 is illustrated in the remaining portion of the floor section D shown in Fig. 1. As illustrated therein the individual sill boxes and outlet units, herein shown as three in number, are connected by cross ducts 96, 97 and 98 respectively from the different sets of hot and cold air floor cells into which the hot and cold air from the header ducts 80 and 81 flows, as will be apparent from an inspection of Fig. 1.

It will be understood that these two systems of air distribution may be used in those portions of the building where the floor cells run parallel to the sides of the service core as distinguished from those portions such as A and B where the floor cells are at right angles to the ends of the service core.

While the structure of cellular metal floor illustrated in the Young patent above referred to may be used to conduct the conditioned air to the various outlets above referred to, the preferred form of floor is illustrated in Fig. 8 wherein the standard cellular unit 100 of floor section comprises four cells of similar contour, and it is preferred to erect the floor utilizing with alternate cellular units 100 a series of units 102 having a single enlarged cell of a sectional dimension such as to conduct a relatively large volume of air therethrough. This cell unit 102 is preferably of a width equal to one half the width of a standard unit 100 and is preferably constructed with male and female lips 103, 104 at the margins thereof for cooperation with corresponding lips on the margins of the standard units 100. In the preferred construction of the floor for the embodiment in a multi-story building embodying the invention, the enlarged air carrying cellular units 102 are erected in alternate relation to the standard units. In this manner it is possible to maintain the desired electrical wiring potential of the floor without detracting from the use of the floor for conducting the conditioned air to the various outlets discharging into the various parts of the building at a particular story thereof or downwardly through ceiling outlets to the story below. As best illustrated in Figs. 9 through 16, the improved air carrying cell unit may and preferably will comprise an upper member 110 of substantially U shape having flanges 112 at the marginal portions of the legs 113 thereof. The inverted thus flanged U-shaped upper member 110 is adapted to fit within the generally U-shaped lower member 114 to provide space between the legs 115 of the lower member and the legs 113 of the upper member so as to enable the flanges 112 and the lower member to be held to a supporting beam by welds 117 as shown in Fig. 13. Preferably, the end of each upper section 110 terminates a short distance from the end of the lower section 114 so as to permit the end of the lower section at the wall of the building to be closed and sealed by flanged end sealing members 120 which may be welded to the bottom section 114 and to the supporting beam as shown in Fig. 11. The flanged sealing members 120 may be caulked with cementitious sealing compound and the concrete floor fill further assists in sealing the ends of the cells. In erecting the floor, the lower sections of the air carrying cellular units are erected in end abutting relation, such as is shown in Fig. 9, and in the modified form shown in Fig. 10. The joints between abutting lower sections may be taped and sealed by a suitable cementitious sealing compound as indicated at 116 so as to reduce possibility of air leakage to a minimum. At the intermediate joints where the ends of the upper members of the air carrying sections are cut back and the ends of the lower sections abut one another, the lower sections are preferably welded to the beams, as indicated in Fig. 15, and cover plates 124 are installed and sealed to the ends of the upper sections as illustrated in Figs. 13 and 16. In practice both tape and sealing compounds may be used with advantage to insure air-tight air carrying cells at all joints between adjacent sections.

In one aspect of the invention the present system lends itself to the use of high velocity air arranged to be forced by a blower unit either in the basement of the building or in the riser duct units and to be transmitted through the floor in a path which embodies connected separate hot air ducts and separate cold air ducts. Provision is made for controlling the volume of the air by suitable dampers 130 in the respective ducts, and in one embodiment of the invention, as shown in Fig. 3, the hot and cold air may be mixed prior to their conduction through the floor cells where the high pressure air is caused to pass through a throttle member which may comprise a damper to reduce its pressure from high to low so that when discharged through either the usual window outlet or through the ceiling outlet to the floor below, the air is travelling at relatively low velocity and at relatively low pressure and may enter the room without creating objectional air currents.

In another embodiment of the invention the hot and cold air may be mixed in specially designed outlets, as will be described, just prior to discharge of the air into the building. The noise incident to the air travelling at high velocity and even at low velocity may, in accordance with the present invention, be effectively overcome by acoustical material in the floor cells through which the air travels, and as illustrated in Figs. 33 to 37, an acoustical cartridge 140 may be placed at the entrance end of the floor cells or may be placed at the delivery end of the floor cells, and in either event may and preferably will be removable so as to permit its installation during the construction of the floor and air distributing system. For some purposes it may be desirable to embody the acoustical material in the form of a preformed block or cartridge in a section of the floor cells prior to the erection of the floor.

Certain features of the present invention may be used with advantage in connection with the distribution of air in accordance with and by the apparatus used in prior air conditioning systems of the type in which primary air is conducted to specially designed window outlets located near the periphery of the outer walls of the building and in which secondary air is induced from the room to thereby effect the proper conditioning of the air within that portion of the building. As illustrated in Figs. 41, 42 such a primary air duct system may include the riser duct 150 connected by a connecting duct 152 to cells 153 of a multicellular load supporting floor member 154, and the primary air conducted through the floor cells may be conducted to an outlet box 155 of any usual or preferred structure wherein secondary air from within the building is induced through inlets 156 by the flow of primary air through the orifice 157 and through the outlet box and mixed with the secondary air where it may be discharged into the building through the outlet 158. The secondary air inlet may be provided with heating or cooling coils 159 through which a heating or cooling medium may be circulated from a source of supply thereof. As the secondary air passes over the coils it is conditioned and when mixed with the primary air serves to condition the air being discharged into the building through the outlet 158.

Referring now to Fig. 3 in which, as above stated, provision is made for mixing the hot and cold air prior to the introduction of the same into the floor cells, it is preferred to utilize the air mixing unit indicated generally at 54 and illustrated in Figs. 17, 18 and 21, including thermostatically controlled damper operating mechanism which is so designed as to open and close dampers controlling the flow of cold and hot air into a central mixing chamber from which it may pass into the floor cells, and at the same time to provide such character of damper operating mechanism that when the system is operating in the summer on cold air either of the same or different temperatures, instead of hot and cold air, it is possible to adjust the control system to utilize the same mechanism to increase the total volume of cold air over that being supplied through the conduit 71 shown in Fig. 3.

Referring now to Figs. 17, 18 and 21, the mixing unit 54 illustrated therein involves two entrance openings 202, 204. During normal use one opening 202 will, as indicated in Figs. 1 and 3, be connected by the connecting duct 70 to the hot air distributing duct 52 hung in the corridor and through which hot air is conducted from the hot air riser 20 and led into the mixing chamber. Similarly, cold air is led into the opposite end opening 204 of the mixing chamber through the opening duct connections including the duct 71. The flow of hot and cold air from the openings 202, 204 is controlled by two sets of dampers, one set comprising an upper damper 210, and a lower damper 212, and the other set upper and lower dampers 214, 216. The upper and lower dampers of each set are connected by toggle linkage 217, as shown.

Provision is made for operating the dampers from a thermostat 220 of the well known pressure actuated type now being manufactured by several of the leading manufacturers. As indicated in Fig. 17, the thermostat 220 is supplied with air presure from the supply line 222 connected with a compressor or other source of air under pressure, and is also connected by a line 223 with a damper operating motor indicated at 230. As shown in detail in Fig. 20a, the motor 230 comprises a cylinder 231 having a piston 232 connected in sealed relation to the cylinder by a rolling rubber sleeve or diaphragm 233 and capable of sliding in the cylinder in accordance with variations in air pressure in the head end of the cylinder and to which the line 223 is connected. The second end of the cylinder is provided with two coil springs; one spring 234 controls the piston movement for a portion of the travel and, for example, may be of a strength to oppose piston movements corresponding to air pressure variations of from 5 to 10 lbs. per sq. in., assuring a supply of air pressure to the thermostat of 15 lbs. per sq. in., and the second spring 234a is of shorter length and arranged to become operative and control the continued piston movement within a range for example of from 10 to 15 lbs.

The piston is connected by a piston rod 237 through an adjusting nut 238 on a link 239 to an arm 240 on a shaft 241 upon which a three sectioned operating lever 242 is secured to rock therewith. The two end sections 243, 244 of the lever are arranged to break in opposite directions against leaf springs 245, 246 during pivotal movement of the shaft 241, as will be described. Each end section 243, 244 is connected by a link 247, 248 to a short arm 249, 250 fast on shafts 251, 252 respectively to which the lower dampers 212, 216 are fixed. Pins 260, 261 are provided to effect breaking of the end sections, as will be described.

As above set forth, during normal use as for example in winter when it is desired to increase the temperature of the cold air by the mixture of hot air and during which period the pressure actuated thermostat functions between one set of limits, as for example between 5 and 10 lbs. pressure under a supply line pressure of 15 lbs., the damper operating mechanism functions to move the dampers between the position shown in Fig. 18 and that shown in Fig. 17 and to modulate the mixture of hot and cold air in response to the movements of the three section operating lever as a rigid member between such limits. In this way the correct proportioning of hot and cold air is obtained in the central mixing chamber. From the latter, as shown in Fig. 17, the air passes through a set of throttling dampers 275 which may be manually set to throttle the air from a higher to lower pressure just before the air is delivered into the floor cells, as shown in Fig. 17.

The present damper operating mechanism is arranged so that by increasing the operating air pressure in the supply line, as for example to 30 lbs./sq. in. by adjustment of the compressor, then the piston of the damper motor can be made to effect further movement to the right viewing Fig. 17 to a maximum position of Fig. 21 where the set of dampers 210, 212 are again opened, while the other set moves to an intermediate but substantially open position. In this manner both hot and cold air ducts are opened to supply an increased volume of air so that in summer the capacity of the two ducts of the dual system can be used when the conditions call for increased cooling.

In order to provide a sill box in which the hot and cold air is mixed within the sill box in proportions controlled by a thermostat erected in the portion of the building adjacent the sill box, reference is made to Figs. 25 and 27 which illustrate different constructions of such sill boxes. As shown in Fig. 25, the hot and cold air may be supplied from crossover ducts, such as the ducts 97 or 98 in Fig. 1, and this air is led upwardly into a base box 106 which may be erected on top of the cellular floor and set into the finished concrete and into which the connecting ducts upstanding from the crossover ducts fit. The base box 106 may serve as a screed box and is provided with two duct connections 107 formed integrally with the bottom thereof. The base box has removably mounted thereon a damper operating mechanism which includes a damper box 108 illustrated in Fig. 26b providing duct sections which fit around and cooperate with the duct connections 107 of the box to form continuations thereof. The damper operating box has mounted thereon a pair of dampers 125 for each air stream, and the dampers are connected by toggle links 126 arranged to be operated by the same damper operating mechanism which has been above described in connection with the structure of Figs. 17, 18 and 21, and the connections between the thermostat 127 and the damper operating motor 128 are as above described.

In the structure shown in Fig. 27 the floor cells are provided with duct connections upstanding therefrom, and the sill box comprises a housing 129 adjustably secured to angle brackets 123 affixed to the concrete above the cellular floor cells. The housing is provided with internal duct structure 131 which inclines from each side thereof, and each duct structure is provided with two pivoted dampers 132 connected by toggles 133 and arranged to be operated in the same manner as the damper operating mechanism illustrated in Fig. 25 and described in detail in connection with the damper operating mechanisms shown in Figs. 17, 18 and 21. In connection with both types of sill boxes, the dampers and the operating mechanisms are readily removable as a unit so as to facilitate repair and maintenance thereon. In Fig. 22 I have illustrated another form of diffuser for use in the various instances in the air distribution system where the air flowing through the air cells has been previously mixed. This structure is designed to diffuse the previously mixed air from a plurality of air cells, herein shown as two. Essentially, the diffused may comprise a hood adjustably mounted on brackets affixed to the concrete and having in its upper portion a throttling damper 135 for controlling the flow therefrom. The connection to the floor cells may be made as illustrated in Fig. 23. In Fig. 24 I have illustrated the connection between a mixing chamber 136 of the type illustrated in Fig. 17 and from which the controlled mixed air is conducted through a duct 137 and supplied to a manifold 138 leading to a pair of the floor cells.

In Figs. 38, 39 and 40 I have illustrated various forms of air foils 139 which may and preferably will be used wherever connections are made to and from the air carrying floor cells which effect change in the direction of air flow to reduce to a minimum friction losses and noises. The air foils 139 may be of the stationary type shown in Figs. 39 and 40, or as shown in Fig. 38, the air foil 139 is constructed so that the upper member 141 thereof may be adjusted vertically, as for example from the full to the dotted line position and thereby serve as a combined air foil and throttling valve. Preferably, the connection to the floor cell will involve a flanged frame bolted at the corners to the floor cell and preferably tack welded thereto at intermediate points and to which the duct connection is made for leading the air into the floor cell. The lower portion 143 of the foil may be secured in fixed relation to the floor cell and the flanged collar and the upper portion provided with a slot through which a bolt 144 may extend and the parts clamped by a wing nut 145 to permit the upper portion of the foil to be adjusted vertically and secured in such position.

The provision of the throttling means serves to reduce the pressure and velocity of the air discharging from the outlet means to a relatively low value whereby the throttling means in effect converts the plurality of floor cells into a high pressure plenum chamber.

In Figs. 29 and 30 I have illustrated suitable ceiling outlets 160 which may be utilized wherever it may be desired to mix hot and cold air from the air carrying floor cells and discharge the same in controlled proportions into the story below the floor. As indicated, these outlets have two sets of dampers 162, 163 arranged to be operated by thermostatically controlled damper operating mechanism of the construction above described. In Figs. 31 and 32 I have illustrated a single duct type of ceiling or floor outlet which finds use in diffusing cold air only to an intermediate portion of the interior building, as indicated at 165 in Fig. 1. The dampers controlling the single flow of air may be actuated by a damper operating motor of the type shown in Fig. 20a.

In Figs. 8, 8a and 8b I have illustrated a portion of the present floor in which provision is made for distributing wiring through spaced units 100 of the floor and at the same time to distribute hot and cold air through spaced and selected air cells 102. In order to prevent possibility of damage to the insulation of the wiring in the wiring cells I provide a sheet of insulation 103 of substantial thickness between the top of the hot air cells and the crossover ducts of the wiring system and also between the wiring ducts and the underlying hot air ducts by which the hot air may be carried to and introduced into the floor cells. By means of this insulation the transmission of heat to the wiring cells is reduced to a minimum.

From the above description it will be apparent that the present dual duct system of air distribution and air conditioning in the broad sense of the term lends itself to use in commercial multi-story buildings to provide an efficient, economical system wherein economies in the structure of the building may also be effected as a direct result of the system. Radiant heating from the floor may provide a portion of the heat requirements for the building. By filtering means provided in the basement all of the air conveyed through the risers through the floor cells and discharged into the building may be filtered, a result not possible with prior commercial air conditioning systems of the type wherein secondary air from within the building is induced through the sill boxes.

Having thus described the invention, what is claimed is:

1. In a multi-story building and air conditioning structure, means forming a vertical service core in said building; spaced horizontal floor supporting beams disposed about said core forming the stories of said building; metallic cellular load supporting floors erected directly upon said beams and including cells defining passages for air flow therethrough and extending transversely of said beams; two vertical air supply ducts in said service core through which air streams of different condition flow; means forming a passageway in said building between adjacent stories along a portion of said core; means extending along said passageway and connected to said air supply ducts and constituting separate headers for the distribution of the two air streams of different condition from said air supply ducts; means connecting said headers to selected floor cells for introducing said differently conditioned air streams into different floor cells; outlet means from said different floor cells communicating with portions of the building outwardly of said passageway; and means for mixing said differently conditioned air streams prior to discharge from said outlet means to the portions of the building to be conditioned.

2. In a multi-story building and air conditioning structure, means forming a vertical shaft for said building; spaced horizontal floor supporting beams disposed externally of said vertical shaft forming the stories of said building; a metallic cellular load supporting floor supported by and above said beams at selected stories and including cells defining passages for air flow therethrough and extending transversely of said beams; vertical air supply duct means in said vertical shaft through which separate streams of differently conditioned air flow; means in said building adjacent a portion of said vertical shaft providing a space for header means at said selected stories of the building; header means at said spaces communicating with said vertical air supply duct means; means at said selected stories connecting said header means with selected floor cells; outlet means connected with said selected floor cells and having discharge means communicating with the part of the interior of the building to be conditioned; and mixing means for mixing the differently conditioned air streams prior to discharge from said outlet means.

3. A structure as defined in claim 2, in which the space adjacent the vertical shaft is a corridor and the header means is located in the corridor adjacent the floor above the corridor.

4. A structure as defined in claim 2, in which the space adjacent the vertical shaft is a corridor and the header means is located between a ceiling in the corridor and the floor above the corridor, and wherein the ceiling externally of the corridor is higher than in the corridor.

5. In a multi-story building and air conditioning structure, means forming a vertical shaft for said building; spaced horizontal floor supporting beams disposed externally of said vertical shaft forming the stories of said building; a metallic cellular load supporting floor supported by said beams at selected stories and including cells defining passages for air flow therethrough and extending transversely of said beams; at least two vertical air supply ducts in said vertical shaft through which separate conditioned air streams flow; means in said building adjacent a portion of said vertical shaft providing a space for header means at said selected stories of the building; header means in said spaces connected to said vertical air supply ducts for the distribution of the two separate conditioned air streams from said vertical air supply ducts; means at said selected stories connecting said header mean to selected floor cells for introducing said separate conditioned air streams into different floor cells; and outlet means communicating with at least one of each of said different floor cells and communicating with the part of the interior of the building to be conditioned.

6. A structure as defined in claim 5, including means for mixing the conditioned air streams prior to discharge from the outlet means.

7. In a multi-story building and air conditioning structure, means forming a vertical shaft for said building; spaced horizontal floor supporting means disposed externally of said vertical shaft forming the stories of said building; a metallic cellular load supporting floor supported by said beams at selected stories and including cells defining passages for air flow therethrough and extending transversely of said beams; at least two vertical air supply ducts in said vertical shaft for supplying separate high velocity air streams of different condition; means in said building adjacent a portion of said vertical shaft providing a space for header means at said selected stories of the building; header means in said spaces connected to said vertical air supply ducts for the distribution of the two separate air streams of different condition from said vertical air supply ducts; means at said selected stories connecting said header means to selected floor cells for introducing a differently conditioned air stream into different floor cells; and outlet means communicating with at least one of each of said different floor cells and communicating with the part of the interior of the building to be conditioned.

8. A structure, as defined in claim 7, including means for mixing the air streams prior to discharge from the outlet means.

9. A structure, as defined in claim 7, including means for mixing the air streams in the outlet means.

10. A structure, as defined in claim 7, including means for throttling the air streams prior to discharge from the outlet means.

11. A structure, as defined in claim 7, including means for throttling said air streams in the air passages in the floor.

12. A structure, as defined in claim 7, including means for throttling the air streams in the outlet means.

13. A structure, as defined in claim 7, including means for mixing and throttling the air streams prior to discharge from the outlet means.

14. In a multi-story building and air conditioning structure, means forming a vertical shaft for said building; spaced horizontal floor supporting beams disposed externally of said vertical shaft forming the stories of said building; a metallic cellular load supporting floor supported by said beams at selected stories and including cells defining passages for air flow therethrough and extending transversely of said beams; at least two vertical air supply ducts in said vertical shaft for separate air streams of different condition; means in said building adjacent a portion of said vertical shaft providing a space for ducts at said selected stories of the building; header means in said spaces connected to said air supply ducts for the distribution of the two separate air streams of different condition from said air supply ducts; means at said selected stories connected to said header means for mixing said air streams of different condition; means for introducing said thus mixed air streams into selected floor cells; and outlet means from said selected floor cells communicating with the part of the interior of the building to be conditioned.

15. In a multi-story building and air conditioning structure, means forming a vertical shaft for said building; spaced horizontal floor supporting beams disposed externally of said vertical shaft forming the stories of said building; a metallic cellular load supporting floor supported by and above said beams at selected stories and including a plurality of generally parallel air distributing cells extending transversely of said beams, each of said selected stories having an air supply header duct between said beams extending transversely of its air distributing cells and communicating with selected ones of its air distributing cells and also having a header-equalizing duct between said beams and spaced from said air supply header duct and extending transversely of and communicating with some of said selected ones of its air distributing cells; vertical air supply duct means in said vertical shaft through which conditioned air flows to each of said selected stories; means in said building adjacent a portion of said vertical shaft providing a space for header means at said selected stories of the building; each of said selected stories also having header means in its associated space connected to said vertical air supply duct means for the distribution of conditioned air from said vertical air supply duct means and having means connecting said header means with said air supply header duct for introducing conditioned air into its air distributing cells; and a plurality of outlets opening into the portion of the building to be conditioned and disposed at longitudinally spaced intervals relative to said air distributing cells of each story and each communicating with at least one of said selected air distributing cells at the story.

16. In a building and air distributing structure, floor supporting beams; a metallic cellular load supporting floor including a plurality of generally parallel air distributing cells supported by and above said beams; an air supply header duct between said beams through which conditioned air flows extending transversely of said air distributing cells and communicating with selected ones of said air distributing cells; an air header-equalizing duct between said beams spaced from said air supply header-duct and extending transversely of and communicating with some of said selected ones of said air distributing cells; and a plurality of outlets disposed at longitudinally spaced intervals relative to said air distributing cells and each communicating with at least one of said selected air distributing cells.

17. A building structure as defined in claim 16, wherein a plurality of the outlets are located between the air supply header duct and the air header-equalizing duct.

18. In a multi-story building and air conditioning structure, means forming a vertical shaft for said building; spaced horizontal floor supporting beams disposed externally of said vertical shaft forming the stories of said building; a metallic cellular load supporting floor supported by said beams at selected stories and including a plurality of generally parallel air distributing cells extending transversely of said beams; each of said selected stories having a first conditioned-air supply header duct extending transversely of its distributing cells and communicating with selected ones of its air distributing cells and also having a first air header-equalizing duct spaced from said first air supply header duct and extending transversely of and communicating with some of said selected ones of its air distributing cells; each of said selected stories also having a second air supply header duct extending transversely of its air distributing cells and communicating with other selected ones of its air distributing cells and having a second conditioned air header-equalizing duct spaced from said second air supply header duct and extending transversely of and communicating with some of said other selected ones of its air distributing cells; a pair of vertical air supply ducts in said vertical shaft through which conditioned air flows to each of said selected stories; means in said building adjacent a portion of said vertical shaft providing a space for headers at said selected stories of the building; each of said selected stories also having headers in its associated space connected to the respective vertical air supply ducts for the distribution of conditioned air from said vertical air supply ducts and having means connecting one of said headers with said first air supply header duct and means connecting the other header with said second air supply header duct for introducing conditioned air into the air distributing cells associated therewith; and a plurality of outlets disposed at longitudinally spaced intervals relative to said air distributing cells of each story and each communicating with at least one of said selected cells supplied by each of said first and second air supply header ducts at the story.

19. A building and air distributing structure, comprising: floor supporting beams; a metallic cellular load supporting floor including a plurality of generally parallel air distributing cells supported by and above said beams; a first conditioned-air supply header duct between said beams and extending transversely of said air distributing cells and communicating with selected ones of said air distributing cells; a first air header-equalizing duct between said beams spaced from said first air supply header duct and extending transversely of and communicating with some of said selected ones of said air distributing cells; a second conditioned-air supply header duct between said beams and extending transversely of said air distributing cells and communicating with other selected ones of said air distributing cells; a second air header-equalizing duct between said beams spaced from said second air supply header duct and extending transversely of and communicating with some of said other selected ones of said air distributing cells; and a plurality of outlets disposed at longitudinally spaced intervals relative to said air distributing cells and each communicating with at least one of said selected cells supplied by each of said first and second air supply header ducts.

20. A building and air distributing structure as defined in claim 19, wherein means are provided for connecting said first air supply header duct to a source of air of one condition and wherein means are provided for connecting the second air supply header duct to a source of air of a different condition.

21. A building and air distributing structure, comprising: floor supporting beams; a metallic cellular load-supporting floor including cells defining a plurality of generally parallel air passages supported by and above said beams; an air supply header duct between said beams and extending transversely of said cells and communicating with selected ones of said cells; means supply-conditioned air to said header duct at high velocity and high pressure; an air header-equalizing duct between said beams spaced from said air supply header duct and extending transversely of and communicating with some of said selected ones of said cells for aiding in the distribution of air to outlet means remote from said air supply header duct; a plurality of the outlet means located between the air supply header duct and the air header-equalizing duct and beyond the latter; and throttling means at each outlet means for reducing the pressure and velocity of the air discharging from said outlet means to a relatively low value, whereby said throttling means in effect converts the plurality of cells into a high pressure plenum chamber.

22. In a multi-storied and air conditioned structure, means forming a vertical shaft for said building; spaced horizontal floor supporting beams disposed externally of said vertical shaft forming the stories of said building; a cellular load supporting floor supported by said beams at selected stories and including cells defining passages for air flow therethrough extending transversely of said beams; at least two vertical air supply ducts in said vertical shaft through which separate conditioned air streams flow; means in said building adjacent a portion of said vertical shaft providing a space for header means at said selected stories of the building; header means in each of said spaces; each of said selected stories having means arranged between said air supply ducts and said header means for mixing said streams prior to introduction into said header means and also having means connecting said header means to selected of its floor cells for introducing the mixed conditioned air into said selected floor cells and also having outlet means connected with its selected floor cells and communicating with the part of the interior of the building to be conditioned.

23. In a multi-story building and air conditioning structure, means forming a vertical shaft for said building; spaced horizontal floor supporting beams disposed externally of said vertical shaft forming the stories of said building; cellular load supporting floor supported by said beams at selected stories and including cells defining passages for air flow therethrough extending transversely of said beams; at least two vertical air supply ducts in said vertical shaft through which separate conditioned air streams flow; means in said building adjacent a portion of said vertical shaft providing a space for header means at said selected stories of the building; header means in said spaces connected to said vertical air supply ducts for the distribution of the two separate conditioned air streams from said vertical air supply ducts; means at each selected story connecting said header means to selected of its floor cells for introducing said conditioned air into its selected floor cells; and outlet means communicating with at least one of each of said selected floor cells and communicating with the part of the interior of the building to be conditioned.

24. A structure as defined in claim 23, including means for mixing the conditioned air streams prior to discharge from the outlet means.

25. A building and air conditioning structure, comprising: means forming a vertical shaft for said building; horizontal floor supporting beams disposed externally of said vertical shaft; a metallic cellular load-supporting floor supported by and above said beams and providing generally parallel air distributing cells extending transversely of said beams; at least two vertical air supply conduits in said vertical shaft for separate air streams of different condition; means in said building adjacent a portion of said vertical shaft providing a space for main headers; main headers in said space connected respectively to different ones of said air supply conduits; an air-supply header duct between said beams connected with one of said main headers and extending transversely of said air distributing cells and communicating with selected ones of said air distributing cells; an air header-equalizing duct between said beams connected with the other of said main headers and spaced from said air-supply header duct and extending transversely of and communicating with some of said selected ones of said air distributing cells; and a plurality of outlets disposed at longitudinally spaced intervals relative to said air distributing cells and each communicating with at least one of said selected air distributing cells.

References Cited in the file of this patent

UNITED STATES PATENTS

| | | |
|---|---|---|
| 402,386 | Baldwin | Apr. 30, 1889 |
| 2,172,771 | Norris | Sept. 12, 1939 |
| 2,182,686 | Young | Dec. 5, 1939 |
| 2,195,691 | Burt | Apr. 2, 1940 |
| 2,422,685 | Keck | June 24, 1947 |
| 2,445,197 | Wiesman | July 13, 1948 |
| 2,609,183 | Fitzgerald | Sept. 2, 1952 |
| 2,616,529 | MacDonald | Nov. 4, 1952 |